United States Patent [19]

Bovio et al.

[11] 4,114,903

[45] Sep. 19, 1978

[54] ROTARY SEAL FOR VACUUM AND PRESSURE SYSTEMS

[75] Inventors: Robert J. Bovio, Lowell; Renaldo Mercaldi, Beverly, both of Mass.

[73] Assignee: GTE Sylvania Incorporated, Stamford, Conn.

[21] Appl. No.: 824,420

[22] Filed: Aug. 15, 1977

Related U.S. Application Data

[63] Continuation of Ser. No. 644,376, Dec. 29, 1975, abandoned.

[51] Int. Cl.² .............................................. F16J 15/34
[52] U.S. Cl. .................................... 277/81 R; 285/281
[58] Field of Search ................. 277/4, 93 R, 85, 96 B, 277/126, 81; 285/279, 280, 281, 278

[56] References Cited

U.S. PATENT DOCUMENTS

| | | | |
|---|---|---|---|
| 2,305,725 | 12/1942 | Meyer | 285/281 |
| 2,331,615 | 10/1943 | Meyer | 285/281 |
| 2,698,195 | 12/1954 | Pollard | 277/81 |
| 3,003,796 | 10/1961 | Meyer | 277/93 |
| 3,015,504 | 1/1962 | Fulton et al. | 277/81 |
| 3,090,627 | 5/1963 | Tankus | 277/85 |
| 3,961,799 | 6/1976 | Peet | 277/81 |

*Primary Examiner*—Robert I. Smith
*Attorney, Agent, or Firm*—Edward J. Coleman

[57] ABSTRACT

A rotary seal device for pressurized gas and vacuum pumping systems comprising an annular member coaxially mounted on the end of a hollow rotary shaft and having a spring-loaded carbon face pressing against a ceramic disc secured in coaxial alignment with the end of a stationary pipe fitting within a housing member having a threaded end cap for adjusting the pressure between the carbon face and ceramic disc.

11 Claims, 4 Drawing Figures

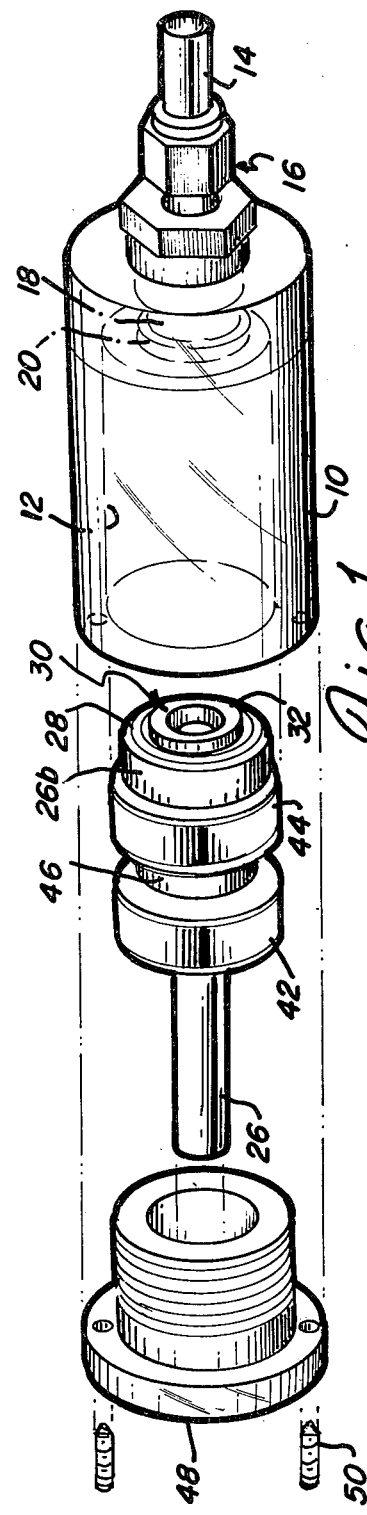
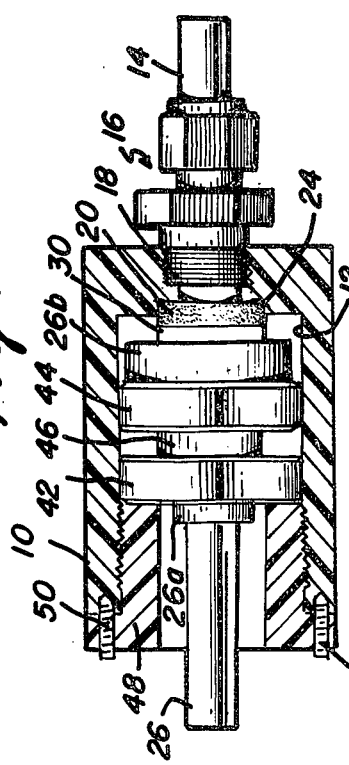
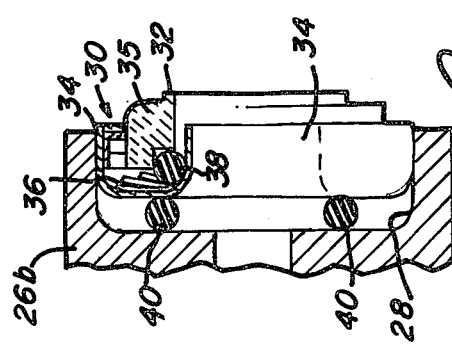
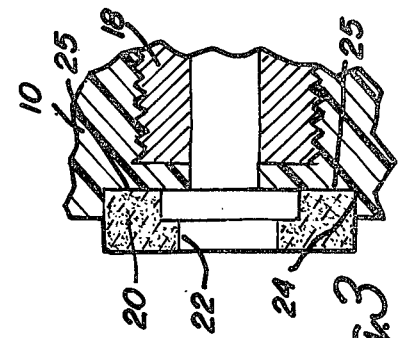

ROTARY SEAL FOR VACUUM AND PRESSURE SYSTEMS

This is a continuation of application Ser. No. 644,376 filed Dec. 29, 1975 and now abandoned.

BACKGROUND OF THE INVENTION

This invention relates generally to pressure seals and, more particularly, to seal arrangements in a piping system for pressurized gas or vacuum pumping which permits rotary motion of the vessel being filled or evacuated.

In the manufacturing of lamps, it is desirable in many applications to have the lamp envelope rotating at high speeds while at the same time filling the lamp with pressurized gas or pumping gas from the lamp to create a vacuum therein. For example, the lamp envelope may be mounted on a rotating lathe over a glass-sealing fire, and uniform glass necking and sealing operations may be performed while at the same time pumping and flushing the interior of the lamp. In order to obtain such an arrangement, a rotary seal that is stationary at one end and free to rotate at the other end is required. Such a seal must be vacuum and pressure tight when rotating.

Previously available rotary seal devices have been relatively complicated and expensive. For example, such devices have involved the use of a plurality of graphite O-rings on a polished, hardened steel shaft having an apertured bore therethrough and rotatably mounted within a steel cylinder. The outer cylinder included a plurality of inlet and outlet bores and additional bores associated with an axilliary vacuum pumping system to assure a gas-tight vacuum seal about the O-rings.

SUMMARY OF THE INVENTION

In view of the foregoing, it is an object of this invention to provide an improved rotary seal for vacuum and pressure systems which is of a considerably more simplified and economical design than heretofore available.

The above and other objects, advantages and features are attained in accordance with the invention by a rotary seal comprising a housing means having a hollow interior, first and second pipe means respectively entering opposite ends of the housing means, a ceramic disc-like member having an orifice therethrough and fixedly secured in coaxial alignment with the end of the first pipe means within the housing, and an annular member having a spring-loaded carbon face and fixedly secured in coaxial alignment with the end of the second pipe means within the housing. A threaded end cap retains the above members in coaxial alignment within the housing with the carbon face pressed against the ceramic disc. At least one of the pipe means is rotatable, and the pressure exerted by the carbon face against the ceramic disc can be adjusted by screwing the threaded end cap in or out of the housing.

BRIEF DESCRIPTION OF THE DRAWINGS

This invention will be more fully described hereinafter in conjunction with the accompanying drawings in which:

FIG. 1 is an exploded perspective view of a rotary seal assembly in accordance with a preferred embodiment of the invention;

FIG. 2 is an elevational view, partly in section, illustrating the assembled rotary seal of FIG. 1;

FIG. 3 is a detailed sectional view of the ceramic member employed in the assembly of FIGS. 1 and 2 together with a fragmentary section of the surrounding structure; and FIG. 4 is a detailed view, partly in section, of the annular member with spring-loaded face employed in the assembly of FIGS. 1 and 2 together with a fragmentary section of the retaining structure engaging the member.

DESCRIPTION OF PREFERRED EMBODIMENT

In the preferred embodiment of the invention illustrated in FIGS. 1 and 2, the rotary seal assembly is shown as comprising a cylindrical housing member 10 of a plastic material, such as clear acrylic, having a hollow interior in the form of a cylindrical bore 12. A first inlet/outlet pipe 14 enters one end of the housing member 10 and is fixedly secured thereto by means of a pipe-fitting assembly 16, a portion 18 of which is threadably engaged in a hole provided in the end of the housing. A ceramic disc-like member 20 having an orifice 22 therethrough, as best shown in the sectional detail of FIG. 3, is fixedly secured within a cylindrical recess 24 at the end of the cylindrical bore in housing 10. A cement 25 is used for securing the ceramic member so as to provide a vacuum-tight seal between disc 20 and the recess 24 in housing 10. As shown, the pipe-fitting portion 18 and ceramic member 20 are secured in coaxial alignment with each other.

Entering the opposite end of the housing member 10 is a second inlet/outlet pipe comprising a hollow rotary shaft 26 having an enlarged diameter portion 26a and a disc-shaped portion of substantially larger diameter 26b. Fixedly secured within a recess 28 in portion 26b at the end of the rotary shaft is an annular member 30 having a spring-loaded carbon face 32. As shown in the detailed view of FIG. 4, the annular member comprises a thin brass housing 34 shaped to retain an annular carbon member 35 having a polished face 32 which is urged outwardly by a washer-like spring 36 of stainless steel. A seal between the carbon member 35 and the inner portion of the housing 34 is provided by an O-ring 38. The annular member 30 is retained by a press fit within the cylindrical recess 28 in coaxial alignment with the hollow shaft, as illustrated in FIG. 4, and an O-ring is disposed within the recess 28 for providing a sealed fit between the annular member and the shaft.

Both the ceramic disc member 20 and the annular member 30 are commercially available parts.

A pair of roller bearings 42 and 44 are fitted about the rotary shaft portion 26a within the bore 12 and thereby rotatably mount the shaft 26 and annular member 30 within the housing member 10 in coaxial alignment with the ceramic disc member 20. A spacer disc 46 is disposed between the bearings. The portion of the shaft on which the bearings 42, 44 and annular member 30 are mounted is retained within bore 12 by means of an end cap 48 which is threadably engaged in the bore of housing 10. The end cap may be formed of the same plastic material as housing 10 and, when assembled thereto, retains the coaxially aligned members with the polished carbon face 32 pressed against the ceramic disc 20. The pressure of the carbon face against the ceramic disc may then be varied by screwing the threaded end cap in or out of the bore 12. Use of a clear housing 10 enables visual observation of the resulting fit provided between the carbon face and ceramic disc. The end cap may then be secured in place by a pair of screws 50 passing through a flanged portion thereof into the wall of housing 10.

In the completed assembly, shaft 26 is rotatable within the housing means, which is typically held stationary. Accordingly, upon rotation of shaft 26, carbon face 32 rotates against ceramic disc 20 to provide a sealed path via the hollow shaft 26 and pipe means 18, 16, 14 for pressurized gas flow or vacuum pumping.

According to a less preferred but alternate embodiment of the invention, the ceramic disc member may be fixedly secured to the end of the rotary shaft 26, and the carbon-faced annular member 30 may be fixedly secured to the end of housing 10 in coaxial alignment with the end of pipe portion 18. More specifically, the ceramic disc would be inserted into the cylindrical recess 28 in portion 26b of the shaft and secured by cement to provide a vacuum-tight seal therebetween, and annular member 30 would be secured by a press fit into the recess 24 in housing 10 in the same manner as previously described with respect to its mounting at the end of the rotary shaft, using an O-ring 40 to provide a seal. In this alternate assembly, therefore, adjustment of the threaded end cap varies the pressure of the ceramic disc against the carbon face, and rotation of shaft 26 causes the ceramic disc to be rotated against the carbon face to provide a sealed through-path for pressurized gas flow or vacuum pumping.

Hence, although the invention has been described with respect to specific embodiments, it will be appreciated that modifications and changes may be made by those skilled in the art without departing from the true spirit and scope of the invention.

What we claim is:

1. A rotary seal device for vacuum and pressure systems comprising:
    housing means having a hollow interior;
    first and second pipe means respectively entering opposite ends of said housing means and connected thereto, at least one of said pipe means being rotatably mounted within said housing means, the ends of said first and second pipe means within said housing means being axially aligned and spaced apart with one of said pipe means not located within the other;
    a ceramic disc-like member having a orifice therethrough and secured adjacent to the end of said first pipe means within said housing means in coaxial alignment therewith; and
    an annular member secured adjacent to the end of said second pipe means within said housing means in coaxial alignment therewith and having a spring loaded carbon face portion biased toward said first pipe means, said housing means retaining said annular member coaxially aligned with said ceramic member with said carbon face portion pressed against said ceramic member to provide a rotary seal between said ends of said first and second pipe means, whereby the path through said first and second pipe means is sealed from the hollow interior of said housing means.

2. The rotary seal of claim 1 wherein said ceramic member and first pipe means are fixedly secured to an end of said housing means in coaxial alignment, said annular member is fixedly secured to the end of said second pipe means, and said second pipe means is rotatable within said housing means, whereby upon rotation of said second pipe means, said carbon face rotates against said ceramic member.

3. The rotary seal of claim 2 wherein the hollow interior of said housing means comprises a cylindrical bore, and said second pipe means is a hollow rotary shaft, and further including a plurality of roller bearings fitted about said rotary shaft within said bore, and an end cap attached to said housing means and retaining within the bore thereof the portion of said rotatable shaft to which said annular member and roller bearings are attached.

4. The rotary seal of claim 3 wherein said end cap is threadably engaged in the bore of said housing means and thereby adjustable by screwing in or out of the bore to vary the pressure of said carbon face against said ceramic member.

5. The rotary seal of claim 4 wherein the end of said rotary shaft has a disc-shaped portion of substantially larger diameter having a cylindrical recess within which said annular member is retained by a press fit, and further including an O-ring disposed within said recess for providing a sealed fit between said annular member and said rotary shaft.

6. The rotary seal of claim 5 wherein said ceramic member is secured by cement to the end of said housing means for providing a sealed fit therebetween.

7. The rotary seal of claim 6 wherein said housing means is formed of a substantially clear plastic material.

8. The rotary seal of claim 1 wherein said annular member and second pipe means are fixedly secured to an end of said housing means in coaxial alignment, said ceramic member is fixedly secured to the end of said first pipe means, and said first pipe means is rotatable within said housing means, whereby upon rotation of said first pipe means, said ceramic member rotates against said carbon face.

9. The rotary seal of claim 8 wherein the hollow interior of said housing means comprises a cylindrical bore, and said first pipe means is a hollow rotary shaft, and further including a plurality of roller bearings fitted about said rotary shaft within said bore, and an end cap attached to said housing means and retaining within the bore thereof the portion of said rotatable shaft to which said ceramic member and roller bearings are attached.

10. The rotary seal of claim 9 wherein said end cap is threadably engaged in the bore of said housing means and thereby adjustable by screwing in or out of the bore to vary the pressure of said ceramic member against said carbon face.

11. The rotary seal of claim 10 wherein the end of said rotary shaft has a disc-shaped portion of substantially larger diameter having a cylindrical recess within which said ceramic member is fixedly secured by cement for providing a sealed fit therebetween.

* * * * *